United States Patent
Ali et al.

(10) Patent No.: US 8,264,611 B2
(45) Date of Patent: Sep. 11, 2012

(54) SYSTEM AND METHOD FOR VIDEO DOWNSCALING

(75) Inventors: Mohamed Abd El-Salam Ali, 10th of Ramadan (EG); Ahmed Ragab Elsherif, Giza (EG); Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 384 days.

(21) Appl. No.: 12/748,391

(22) Filed: Mar. 27, 2010

(65) Prior Publication Data

US 2011/0234895 A1    Sep. 29, 2011

(51) Int. Cl.
*H04N 11/20*    (2006.01)
*H04N 9/74*    (2006.01)

(52) U.S. Cl. .................................. 348/581; 348/458

(58) Field of Classification Search .......... 348/581, 348/441, 458; 345/660, 665, 667, 668; 358/1.2, 358/528; 382/298–300
See application file for complete search history.

(56) References Cited

U.S. PATENT DOCUMENTS

| | | | |
|---|---|---|---|
| 4,774,678 A * | 9/1988 | David et al. ............ | 345/667 |
| 4,893,258 A * | 1/1990 | Sakuragi ................ | 345/668 |
| 5,294,998 A * | 3/1994 | Piovoso et al. ......... | 382/261 |
| 5,737,101 A * | 4/1998 | Ito ......................... | 358/525 |
| 5,991,464 A * | 11/1999 | Hsu et al. ............... | 382/300 |
| 6,792,149 B1 * | 9/2004 | Florencio ............... | 382/233 |
| 7,551,230 B2 * | 6/2009 | Kondo et al. ........... | 348/581 |
| 2005/0058355 A1 * | 3/2005 | Mitchell et al. ........ | 382/233 |
| 2006/0017849 A1 * | 1/2006 | Lin ........................ | 348/554 |
| 2009/0016607 A1 * | 1/2009 | Chono .................... | 382/181 |

* cited by examiner

*Primary Examiner* — Victor Kostak
(74) *Attorney, Agent, or Firm* — Rahman LLC

(57) ABSTRACT

A system and method for downscaling signal data, where the system includes an antenna receiving video signal data; an analog-to-digital converter coupled to the antenna and converting the received analog signal data to digital signal data; a memory component storing video downscaling instructions; and a video downscaling processor, coupled to the memory component and the analog-to-digital converter, wherein the video downscaling processor, upon reading the video downscaling instructions from the memory component and executing the downscaling instructions: divides the digital video signal data into a plurality of blocks, wherein each block comprises a plurality of pixel elements; and cycles through the plurality of blocks, and for every block in the plurality of blocks, generates a new block, wherein the new block comprises a plurality of new pixels evenly spaced within the new block.

20 Claims, 5 Drawing Sheets

SYSTEM AND METHOD FOR VIDEO DOWNSCALING

BACKGROUND

1. Technical Field

The embodiments herein generally relate to video processing, and, more particularly, to two-dimensional downscaling of a video.

2. Description of the Related Art

Scaling two-dimensional signal data (e.g., video frames) is encountered in many applications. The most common case is the need to display video on screens with different resolutions than the source. There are many displays with different resolutions available today such as VGA (480×640), QVGA (240×320) and many others that are used in different environments.

Running analog TV receivers at 13.5 MHz, for example, yields Y/C component signals with 720 pixels/line and 288 lines for PAL analog TV system (different dimensions are obtained for other analog TV systems, for example, NTSC signal has 704 pixels/line and 242 lines/field). For display on QVGA resolution (320 pixels/line, 240 lines/field), horizontal scaling is required to scale 720 pixels down to 320 pixels with a downsampling ratio of 9/4 (for NTSC, other downsampling ratio is required which is 11/5). Also, to receive the required number of lines/picture by the targeted display, cropping could be used in the case of NTSC by removing the first and last lines. In case of PAL, vertical scaling is needed (as cropping would remove significant part of the picture). Each 288 lines should produce 240 lines; i.e., a downsampling ratio of 6/5.

There are several ways to downsample a given signal. One approach is to simply drop pixels. For example, if downscaling with ratio q/p is required (where p<q), then one simple approach would merely be to select p samples (or lines in vertical direction) from each q samples (or lines). While this method is very simple, the rescaled signal data is affected by aliasing and uneven spacing between samples and lines. Another approach uses a general resampling structure, where the signal is resampled by p in both directions and then filtered by applying a low-pass filter to remove images caused by upsampling and aliasing caused by the next downsample-by-q block. This approach, however, is complex, especially in the vertical dimension, and requires significant memory and processing resources.

SUMMARY

In view of the foregoing, an embodiment herein provides a system for downscaling video signal data to an arbitrary size, the system comprising an antenna receiving video signal data; an analog-to-digital converter coupled to the antenna and converting the received analog signal data to digital signal data; a memory component storing video downscaling instructions; and a video downscaling processor, coupled to the memory component and the analog-to-digital converter, wherein the video downscaling processor, upon reading the video downscaling instructions from the memory component and executing the downscaling instructions: divides the digital video signal data into a plurality of blocks, wherein each block comprises a plurality of pixel elements; and cycles through the plurality of blocks, and for every block in the plurality of blocks, generates a new block, wherein the new block comprises a plurality of new pixels evenly spaced within the new block.

In such a system, the plurality of blocks may comprise a single horizontal line, as transmitted according to at least one of National Television System Committee (NTSC) standard of analog video signal data transmission, Phase Alternate Line (PAL) standard of analog video signal data transmission, and Sequential Color with Memory (SECAM) standard of video signal data transmission. In addition, each pixel element from the plurality of pixel elements may comprise a pixel pair and each new pixel in the plurality of new pixels is generated from the pixel pair. Moreover, the new pixel may be calculated as $(1-d)*M1+d*M2$, where M1 is a first pixel of the pixel pair, M2 is a second pixel of the pixel pair and d is a calculated distance from a start point of the pixel pair. Furthermore, the calculated distance from the start point is a calculated distance from a first pixel of the pixel pair. Additionally, the calculated distance from the start point may depend on a precalculated value r and the precalculated value r is calculated as $q/p-1$, where q is a number of pixels in the block and p is a number of pixels in a new block. In addition, the calculated distance from the start point may depend on the precalculated value r as $(d+r)$, where d is the calculated distance from the start point. Furthermore, the video downscaling processor may skip to another pixel pair when d>1, where d is the calculated distance from the start point.

Such a system may further comprise an anti-aliasing filter coupled to the downscaling processor, wherein the anti-aliasing filter filters the digital video signal data to produce filtered video signal data and remove an aliasing effect of the digital video signal, wherein the removal of the aliasing effect is a prerequisite for the downscaling. Moreover, the video downscaling processor may be coupled to the anti-aliasing filter, upon reading the video downscaling instructions from the memory component and executing the downscaling instructions, downscales the filtered video signal data. In addition, the video downscaling processor may comprise a digital signal processor.

Furthermore, in such a system, the plurality of blocks may comprise a vertical block of horizontal lines as transmitted according to at least one of NTSC standard of analog video signal data transmission, PAL standard of analog video signal data transmission, and SECAM standard of video signal data transmission. Moreover, each pixel element from the plurality of pixel elements may comprise a horizontal line pair and each new pixel in the plurality of new pixels is generated from the horizontal line pair. Furthermore, each new pixel in the plurality of new pixels may be calculated as $(1-d)*L1+d*L2$, where L1 is a first horizontal line of the horizontal line pair, L2 is a second horizontal line of the horizontal line pair and d is a calculated distance from the first line of the horizontal pair.

Another embodiment herein provides a method of downscaling video signal data to produce evenly spaced downscaled video signal data, the method comprising providing video signal data; dividing the video signal data into a plurality of blocks, where each block comprises a plurality of pixel-block pairs; cycling through the plurality of blocks, and for every block in the plurality of blocks, generates a new block, wherein the new block comprises a plurality of new pixel-block pairs spaced within the new block; and calculating, for each pixel-block pair in the plurality of pixel-block pairs, a new pixel-block from the pixel-block pair.

In such a method, the new pixel-block may be calculated as $(1-d)*M1+d*M2$, where M1 is a first pixel-block of the pixel-block pair, M2 is a second pixel-block of the pixel-block pair and d is a calculated distance from a start point of the pixel-block pair. Furthermore, the calculated distance from the start point may depend on a precalculated value r and the precalculated value r is calculated as q/p−1, where q is a number of lines in the block and p is a number of lines in a new block. Moreover, the plurality of blocks may comprise a single horizontal line, as transmitted according to at least one of NTSC standard of analog video signal data transmission, PAL standard of analog video signal data transmission, and SECAM standard of analog video signal data transmission. In addition, the plurality of blocks may comprise a vertical block of horizontal lines as transmitted according to at least one of NTSC standard of analog video signal data transmission, PAL standard of analog video signal data transmission, and SECAM standard of analog video signal data transmission, and a pixel-block comprises a single horizontal line.

Another embodiment herein provides a computer-readable medium encoded with a method written in computer-readable instructions that, when executed by a video downscaling apparatus, instructs the video downscaling apparatus to perform the method, the method comprising dividing digital video signal data into a plurality of blocks, where each block comprises a plurality of pixel or lines pairs; cycling through the plurality of blocks, and for every block in the plurality of blocks, generates a new block, wherein the new block comprises a plurality of new pixels or lines evenly spaced within the new block; and calculating, for each pixel pair in the plurality of pixel or line pairs, a new pixel or line from the pixel or line pair.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
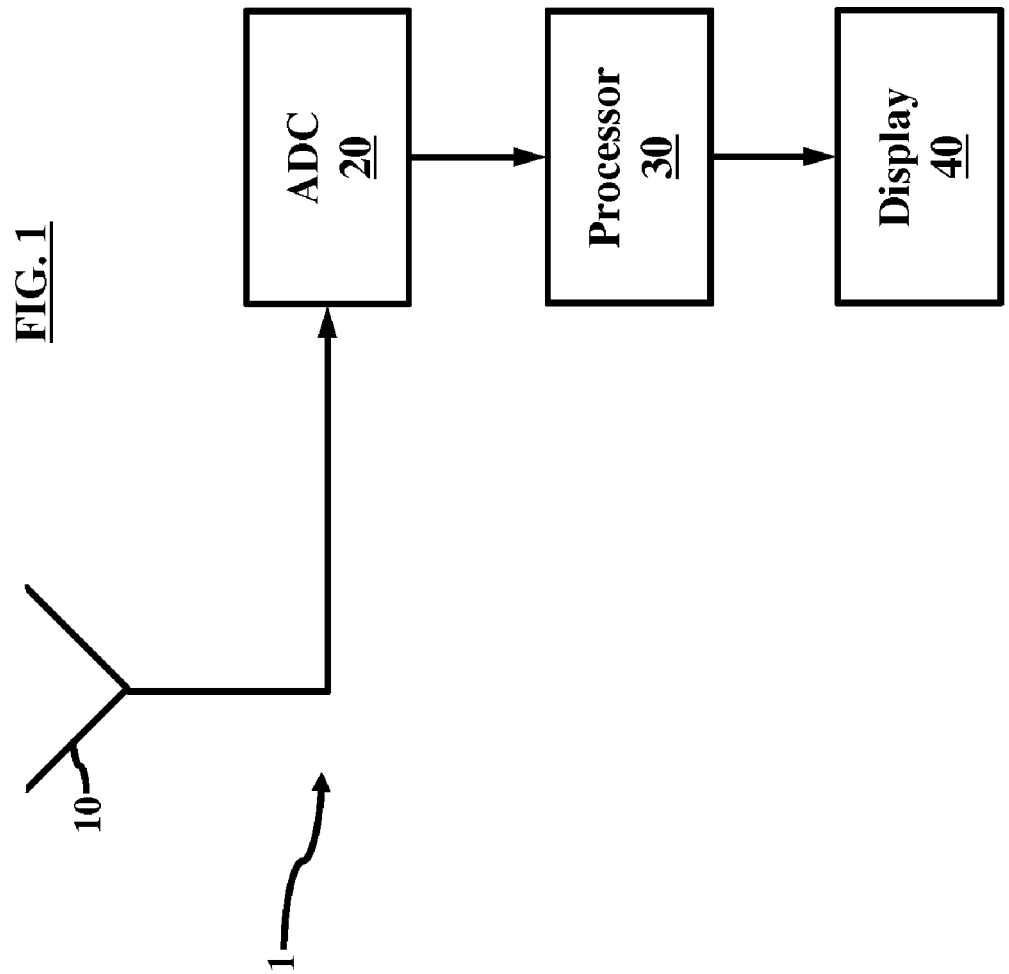
FIG. 1 illustrates a schematic diagram of an apparatus for downscaling video signal data according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an efficient two-dimensional downscaling system and method that could be used with an arbitrary scaling factor to fit different target displays. Referring now to the drawings, and more particularly to FIGS. 1 through 5, where similar reference characters denote corresponding features consistently throughout the figures, there are shown preferred embodiments.

To trade off between efficiency and complexity/cost, the embodiments described herein may be based on linearly interpolating successive samples or lines to produce evenly spaced signal data. FIG. 1 illustrates a schematic diagram of an apparatus for downscaling video signal data according to an embodiment herein. Downscaling apparatus 1 includes antenna 10, analog-to-digital converter ("ADC") 20, video downscaling processor 30, and display device 40. In addition, while not shown in FIG. 1, an anti-aliasing filter may be coupled to video downscaling processor 30 to filter digital video signal data before horizontal downsampling in order to prevent aliasing.

As known to those skilled in the art, additional components may be incorporated into downscaling apparatus 1 without undo experimentation. Examples of such auxiliary components include, but are not limited to digital signal processors, digital-to-analog converters, random access memories, read-only memories, etc. In addition, downscaling apparatus 1 describes one category of device of many possible categories of devices. For example, although downscaling apparatus 1 includes video downscaling processor 30, downscaling apparatus 1 with video downscaling processor 30 represents one device category, other device categories include, but are not limited to devices that replace video downscaling processor 30 with a digital signal processor, a general purpose processor, a Field Programmable Gate Array device ("FPGA") or a reconfigurable computing device. Thus, for example, video downscaling processor may read video downscaling instructions from a memory component (not shown in FIG. 1), and execute those video downscaling instructions. Other components shown in FIG. 1 may be also substituted with other components to described additional categories of devices. In addition, embodiments described herein may be limited to one device category or may include all device categories.

Downscaling apparatus 1 receives analog video signal data via antenna 10. For example, antenna 10 receives, at a 13.5 MHz sampling frequency, video signal data that includes, for example, Y/C component signal data with 720 pixels per horizontal line and 288 lines per field for PAL. Antenna 10 is coupled to ADC 20, where ADC 20 converts the received analog video signal data to digital video signal data. ADC 20 is coupled to video downscaling processor 30, which execute instructions, described below, that instruct video downscaling processor 30 to downscale digital video signal data to an arbitrary size. As described in further detail below, video downscaling processor 30 may support downscaling to fractional ratios while maintaining even spacing between output samples/lines. Video downscaling processor 30 is coupled to display device 40 to display the downscaled digital video signal data.

Figure 2:
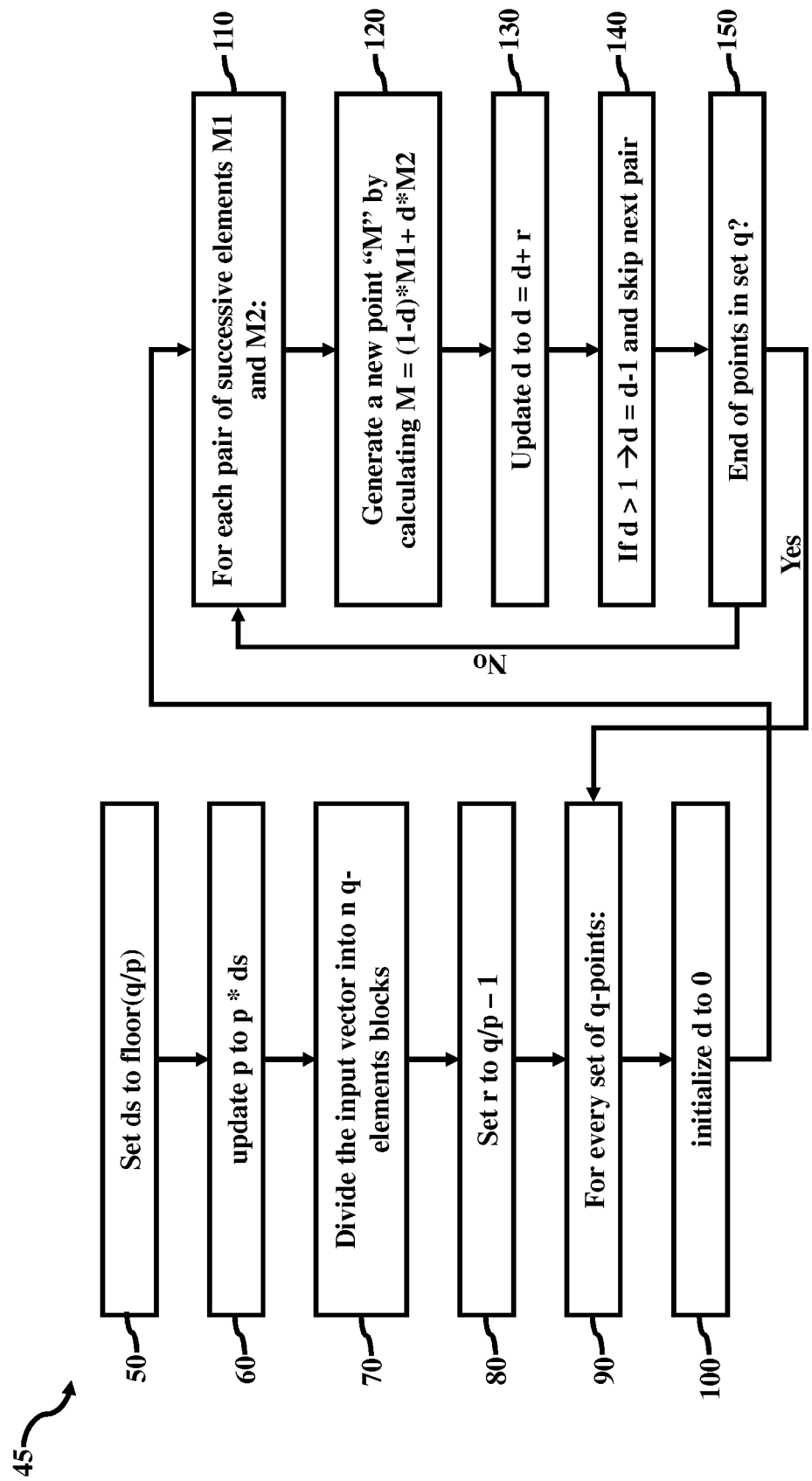
FIG. 2 is a flow diagram illustrating a preferred method according to an embodiment herein.

FIG. 2, with reference to FIG. 1, illustrates a flow diagram of method 45 according to an embodiment herein. Method 45, as shown in FIG. 2, may represent instructions executed by video downscaling processor 30 or other device categories, as described above, or such instructions may be stored on a computer-readable medium. As described in further detail below, method 45 may down-sample video signal data to support fractional ratios while maintaining even spacing between output samples/lines. In FIG. 2, step 50 of method 45 sets a variable "ds" to floor(q/p), where floor(q/p) may include applying a floor function to the q/p ratio. The variable "ds" may indicate an additional down-scaling factor that will be applied to video signal data after down-scaling by q/p. In addition, the variables "q" and "p" may indicate that an input of "q" pixels should produce "p" pixels. In other words, the ratio q/p indicates the need to generate p pixels from each q-pixels block. In addition, as known to those skilled in the art, a floor function may also be called a greatest integer or entier function, and the floor of a nonnegative value may be called the integral part or integral value of that value.

In step 60, the method of FIG. 2, updates the variable p to "p*ds". In step 70, an input vector (e.g., as received from antenna 10 and converted to digital input by ADC 20, both shown in FIG. 1) is divided into "n" blocks of q-pixels each. Next, in step 80, the variable "r" is set to "q/p−1"—where r signifies the step used in updating the distance variable d. Step 90 performs a block of actions for each block of q pixels in the set of "n" blocks and begins the first of two processing loops. Step 100 initializes the variable "d" to 0, where the variable "d" may indicate a distance from the start point of each pair of successive elements.

Step 110 then performs a calculation for each pair of successive elements, where the elements may be given the variable names "M1" and "M2" respectively. In the embodiments discussed below, elements can be either pixels or lines. Moreover, when considering a pair of successive elements, one embodiment described herein uses a starting point as the first element (M1) of a pair of successive elements (M1 and M2). Step 120 then performs a linear interpolation calculation to derive a new value, for example, a new value "M" may be generated by calculating "(1−d)*M1+d*M2" (e.g., via video downscaling processor 30) with reference to the variables described above. After performing such a calculation, step 130 then updates variable "d" to "d+r". In step 140, when the variable "d" is greater that 1, then the variable "d" is reset to "d−1" and the method of FIG. 2 skips the next pair. Next, in step 150, the method of FIG. 2 determines whether there are any more element pairs in the q block currently being processed, and if so, the method returns to step 110. Otherwise, the method of the FIG. 2 returns to step 90.

Figure 3:
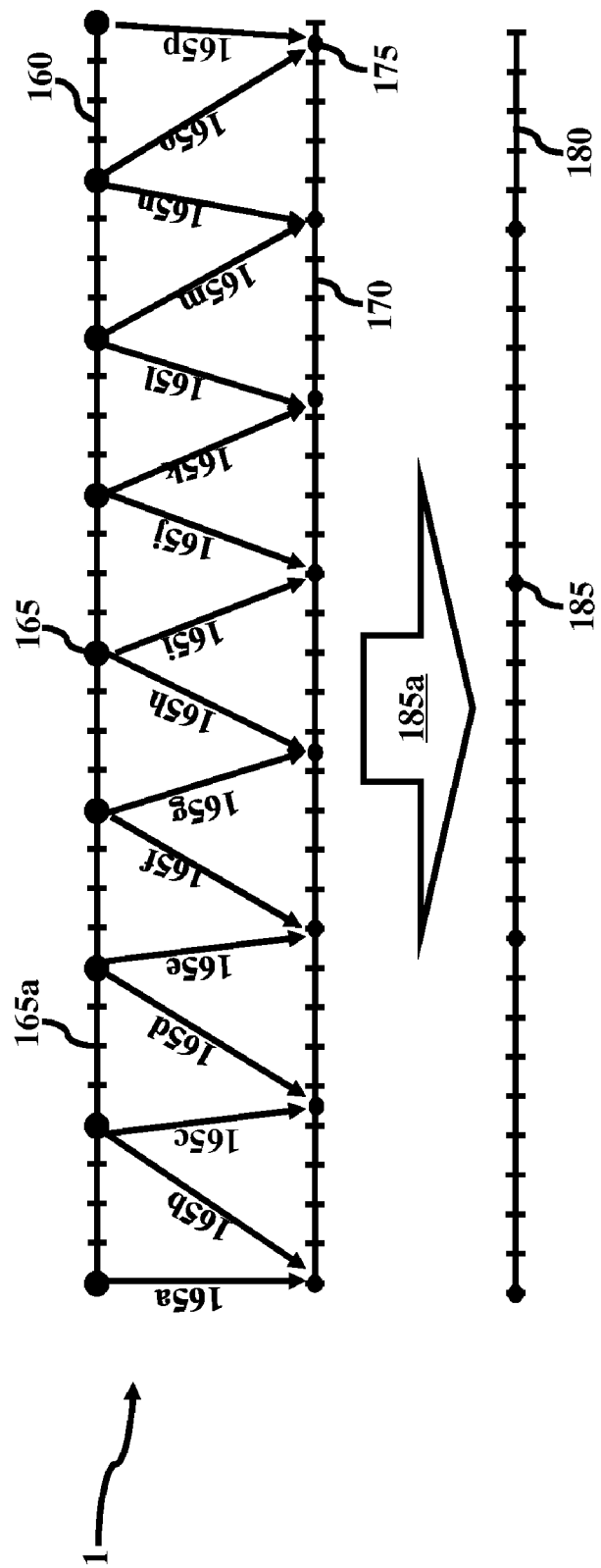
FIG. 3 illustrates a schematic diagram of downscaling horizontal lines according to an embodiment herein.

The method of FIG. 2 is described in further detail below, with reference to FIGS. 3 and 4. FIG. 3, with reference to FIGS. 1 and 2, illustrates a schematic diagram of downscaling horizontal lines according to an embodiment herein. FIG. 3 assumes that a horizontal video signal data will be downscaled (or down-sampled) by a factor of 9/4; i.e., that from each 9-pixels block, there will be generated 4 pixels. Shown in FIG. 3 are horizontal lines 160, 170 and 180. In addition, each horizontal line includes a plurality of pixels; e.g., 165, 175 and 185, respectively. The transformation of line 160 to line 170 generates 8 points out of each 9 successive point blocks. The subsequent transformation of line 170 to line 180 is a down-sampling of line 170 by a factor of 2. Applying method 45, shown in FIG. 2, step 70 divides an input row vector (e.g., horizontal line 160) into n 9-pixels blocks and sets n=80=720/9, where 720 is the number of pixels in horizontal line 160 (e.g., size of a horizontal line according to the PAL standard of transmitting analog video signal data). Next, step 80 sets variable r to (q/p)−1, or more specifically, sets r=(9/8)−1=1/8, where q is 9 pixels, p is 8 pixels. Then, in step 90, for each q pixel-points (e.g., 9 pixel-points) do the following: initialize d=0 (where d is the distance from the first element of each pair of successive elements). Next, for each pair of successive pixel elements, given the variable names M1 and M2, method 45 performs the following calculations (e.g., via video downscaling processor 30): generate new point M=(1−d)*M1+d*M2 and update d=rem (d+r, 1). These calculations are shown in FIG. 3 as transformations 165a through 165p, which transform the 9 pixels 165 in line 160 into 8 evenly spaced pixels 175 on line 170. Line 170 is then down-sampled by calculation 185a (e.g., by dropping one of each two consecutive pixels in line 170) to line 180 to produce 4 evenly spaced pixels 185. Between each horizontal line (160, 170, and 180) in FIG. 3 are a series of tick marks 165a, representing a finer resolution scale of the horizontal line and may be used to gauge where an output pixel should be located after the downscale.

Figure 4:
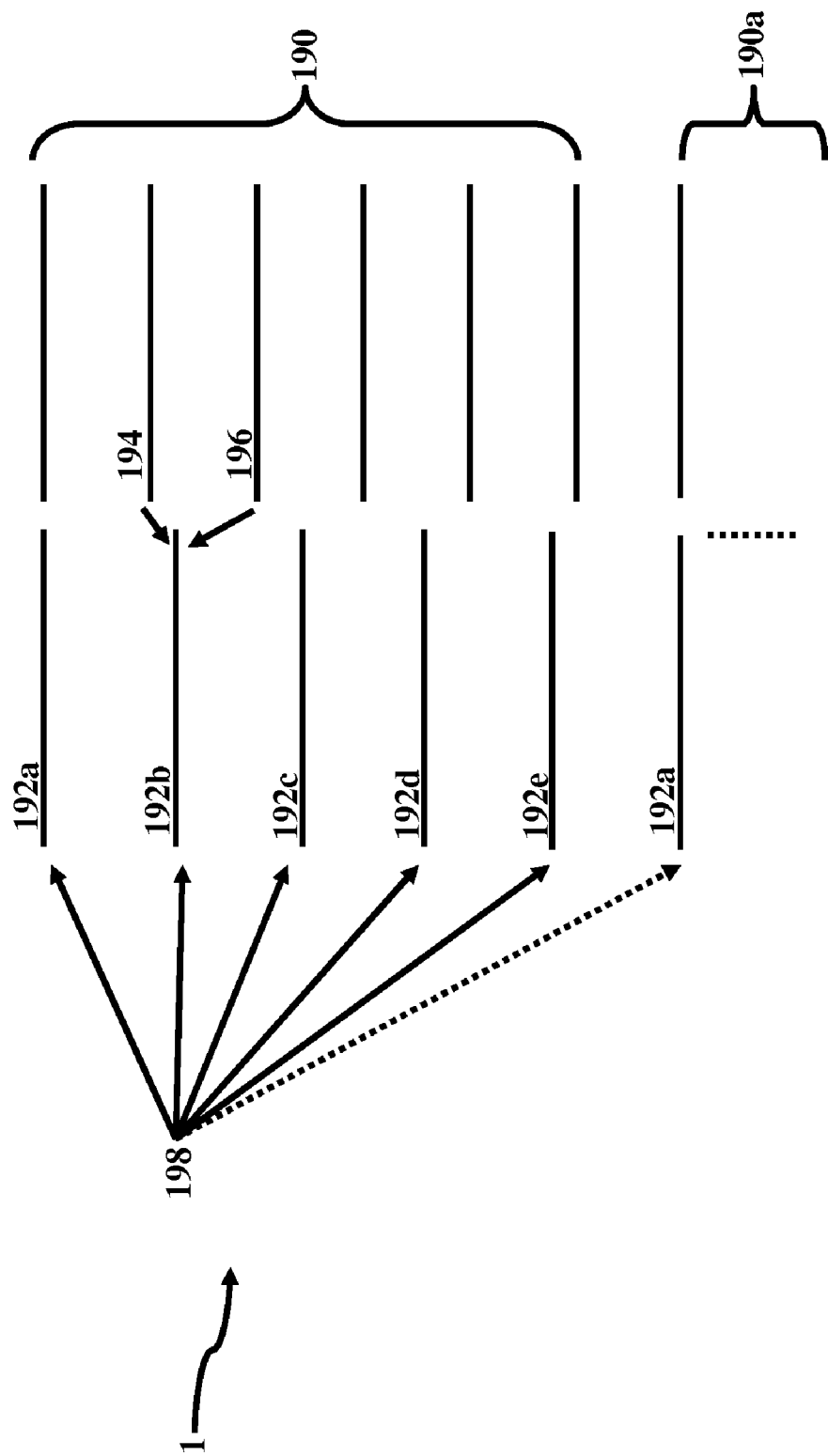
FIG. 4 illustrates a schematic diagram of vertical downscaling of horizontal lines according to an embodiment herein.

FIG. 4, with reference to FIG. 1 through 3, illustrates a schematic diagram of vertical downscaling of horizontal lines according to an embodiment herein. FIG. 4 assumes that the vertical video signal data will be downscaled (or down-sampled) by a factor of 6/5; i.e., producing 5 evenly spaced horizontal lines from each 6 horizontal lines of video signal data. FIG. 4 shows a 190 block of 6 horizontal lines that are down-sampled to a block of 5 horizontal lines (e.g., 192a through 192e) and a subsequent 190a block of 6 horizontal lines. While not shown in FIG. 4, each horizontal line shown includes a plurality of pixels. The transformation of block 190 to block 198 generates 5 horizontal lines out of each 6 successive horizontal lines. In FIG. 4, for each pair of successive horizontal lines (e.g., horizontal line 194 and horizontal line 196) a new horizontal line is generated (e.g., horizontal line 192a by calculating (1−d)*L1+d*L2, where L1 is horizontal line 194, L2 is horizontal line L2 and d is the distance from the first line (L1) of each pair of successive horizontal lines.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
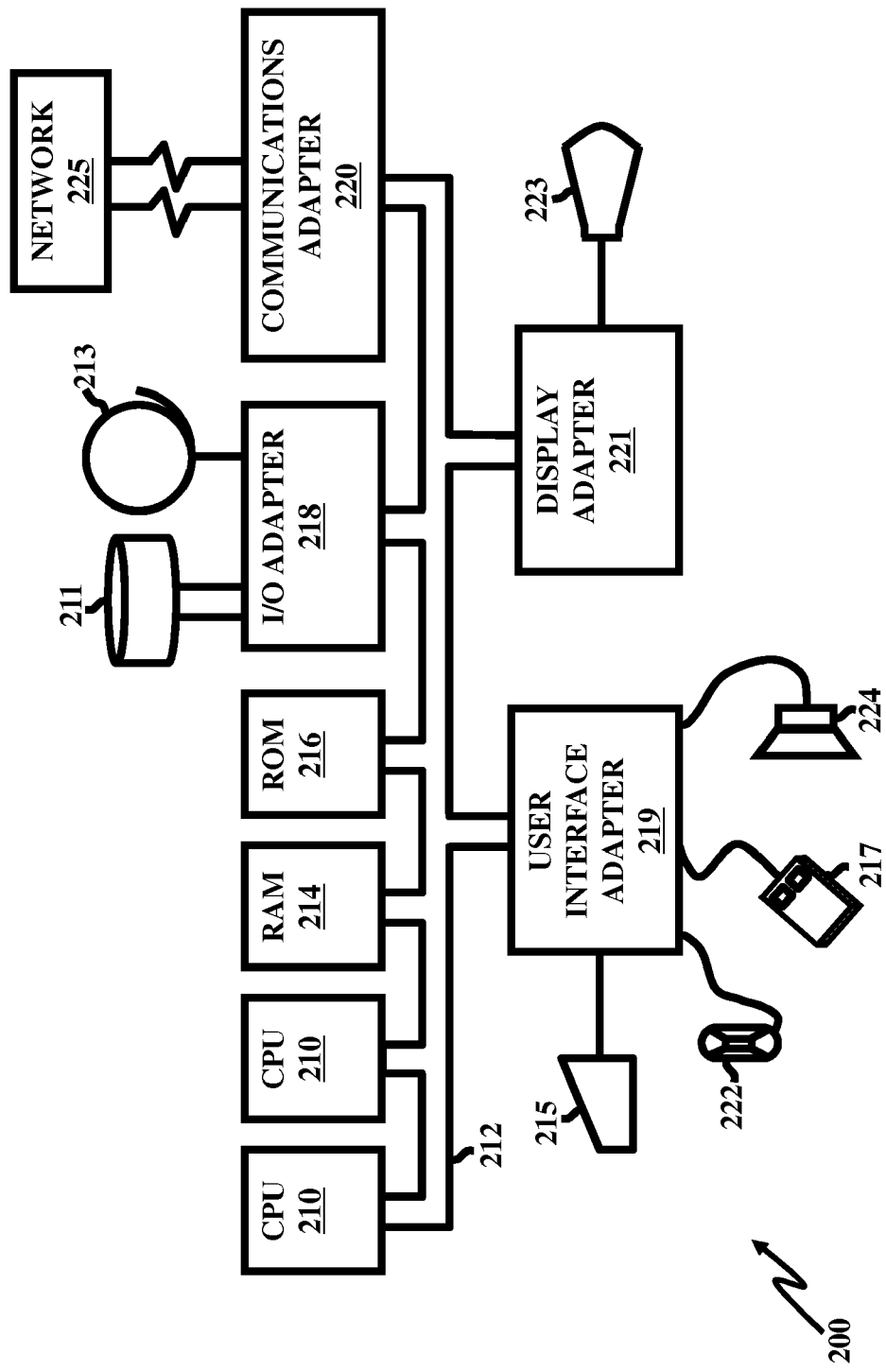
FIG. 5 illustrates a schematic diagram of a computer architecture used in accordance with the embodiments herein.

A more general representation of the hardware environment for practicing the embodiments herein is depicted in FIG. 5, with reference to FIGS. 1 through 4. This schematic drawing illustrates hardware configuration 200 of an information handling/computer system in accordance with the embodiments herein. Hardware configuration 200 comprises at least one processor or central processing unit (CPU) 210. The CPUs 210 are interconnected via system bus 212 to various devices such as a random access memory (RAM) 214, read-only memory (ROM) 216, and an input/output (I/O) adapter 218. The I/O adapter 218 can connect to peripheral devices, such as disk units 211 and tape drives 213, or other program storage devices that are readable by the system. The system can read the inventive instructions on the program storage devices and follow these instructions to execute the methodology of the embodiments herein. The system further includes a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device 223 that may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for downscaling video signal data to an arbitrary size, said system comprising:

an antenna receiving video signal data;

an analog-to-digital converter coupled to said antenna and converting said received analog signal data to digital signal data;

a memory component storing video downscaling instructions; and a video downscaling processor, coupled to said memory component and said analog-to-digital converter, wherein said video downscaling processor, upon reading said video downscaling instructions from said memory component and executing said downscaling instructions:

divides said digital video signal data into a plurality of blocks, wherein each block comprises a plurality of pixel elements; and cycles through said plurality of blocks, and for every block in said plurality of blocks, generates a new block, wherein said new block comprises a plurality of new pixels evenly spaced within said new block, wherein each said pixel element from said plurality of pixel elements comprises a pixel pair and each new pixel in said plurality of new pixels is generated from said pixel pair, and wherein said new pixel is calculated as $(1-d)*M1 + d*M2$, where M1 is a first pixel of said pixel pair, M2 is a second pixel of said pixel pair and d is a calculated distance from a start point of said pixel pair.

2. The system of claim 1, wherein said plurality of blocks comprises a single horizontal line, as transmitted according to at least one of National Television System Committee (NTSC) standard of analog video signal data transmission, Phase Alternate Line (PAL) standard of analog video signal data transmission, and Sequential Color with Memory (SECAM) standard of video signal data transmission.

3. The system of claim 1, wherein said calculated distance from said start point is a calculated distance from a first pixel of said pixel pair.

4. The system of claim 3, wherein said calculated distance from said start point depends on a precalculated value r and said precalculated value r is calculated as $q/p - 1$ where q is a number of pixels in said block and p is a number of pixels in a new block.

5. The system of claim 4, wherein said calculated distance from said start point depends on said precalculated value r as $(d+r)$, where d is said calculated distance from said start point.

6. The system of claim 5, wherein said video downscaling processor skips to another pixel pair when $d>1$, where d is said calculated distance from said start point.

7. The system of claim 1, further comprising an anti-aliasing filter coupled to the downscaling processor, wherein said anti-aliasing filter filters said digital video signal data to produce filtered video signal data and remove an aliasing effect of said digital video signal, wherein the removal of said aliasing effect is a prerequisite for said downscaling.

8. The system of claim 7, wherein said video downscaling processor is coupled to said anti-aliasing filter, and wherein upon reading said video downscaling instructions from said memory component and executing said downscaling instructions, said video downscaling processor downscales said filtered video signal data.

9. The system of claim 1, wherein said video downscaling processor comprises a digital signal processor.

10. A system for downscaling video signal data to an arbitrary size, said system comprising:
   an antenna receiving video signal data;
   an analog-to-digital converter coupled to said antenna and converting said received analog signal data to digital signal data;
   a memory component storing video downscaling instructions; and
   a video downscaling processor, coupled to said memory component and said analog-to-digital converter, wherein said video downscaling processor, upon reading said video downscaling instructions from said memory and executing said downscaling instructions:
      divides said digital video signal data into a plurality of blocks, wherein each block comprises a plurality of pixel elements; and
      cycles through said plurality of blocks, and for every block in said plurality of blocks, generates a new block, wherein said new block comprises a plurality of new pixels evenly spaced within said new block,
   wherein said plurality of blocks comprises a vertical block of horizontal lines as transmitted according to at least one of National Television System Committee (NTSC) standard of analog video signal data transmission, Phase Alternate Line (PAL) standard of analog video signal data transmission, and Sequential Color with Memory (SECAM) standard of video signal data transmission, and
   wherein each said pixel element from said plurality of pixel elements comprises a horizontal line pair and each new pixel in said plurality of new pixels is generated from said horizontal line pair.

11. The system of claim 10, wherein each new pixel in said plurality of new pixels is calculated as $(1-d)*L1+d*L2$, where L1 is a first horizontal line of said horizontal line pair, L2 is a second horizontal line of said horizontal line pair and d is a calculated distance from the first line of said horizontal pair.

12. The system of claim 10, further comprising an anti-aliasing filter coupled to the downscaling processor, wherein said anti-aliasing filter filters said digital video signal data to produce filtered video signal data and remove an aliasing effect of said digital video signal, wherein the removal of said aliasing effect is a prerequisite for said downscaling.

13. The system of claim 12, wherein said video downscaling processor is coupled to said anti-aliasing filter, and wherein upon reading said video downscaling instructions from said memory component and executing said downscaling instructions, said video downscaling processor downscales said filtered video signal data.

14. The system of claim 10, wherein said video downscaling processor comprises a digital signal processor.

15. The method of claim 14, wherein the removal of said aliasing effect permits the downscaling of said video signal data.

16. A method of downscaling video signal data to produce evenly spaced downscaled video signal data, said method comprising:
   providing video signal data;
   dividing said video signal data into a plurality of blocks, where each block comprises a plurality of pixel-block pairs;
   cycling through said plurality of blocks, and for every block in said plurality of blocks, generates a new block, wherein said new block comprises a plurality of new pixel-block pairs spaced within said new block; and
   calculating, for each pixel-block pair in said plurality of pixel-block pairs, a new pixel-block from said pixel-block pair,
   wherein said new pixel-block is calculated as $(1-d)*M1+d*M2$, where M1 is a first pixel-block of said pixel-block pair, M2 is a second pixel-block of said pixel-block pair and d is a calculated distance from a start point of said pixel-block pair.

17. The method of claim 16, wherein said calculated distance from said start point depends on a precalculated value r and said precalculated value r is calculated as $q/p-1$, where q is a number of lines in said block and p is a number of lines in a new block.

18. The method of claim 16, wherein said plurality of blocks comprises a single horizontal line, as transmitted according to at least one of National Television System Committee (NTSC) standard of analog video signal data transmission, Phase Alternate Line (PAL) standard of analog video signal data transmission, and Sequential Color with Memory (SECAM) standard of analog video signal data transmission.

19. The method of claim 16, wherein said plurality of blocks comprises a vertical block of horizontal lines as transmitted according to at least one of National Television System Committee (NTSC) standard of analog video signal data transmission, Phase Alternate Line (PAL) standard of analog video signal data transmission, and Sequential Color with Memory (SECAM) standard of analog video signal data transmission, and a pixel-block comprises a single horizontal line.

20. The method of claim 16, further comprising filtering said digital video signal data to produce filtered video signal data and remove an aliasing effect of said digital video signal.

* * * * *